(12) United States Patent
Reining

(10) Patent No.: US 8,499,409 B2
(45) Date of Patent: Aug. 6, 2013

(54) CLEANING DEVICE COMPRISING A CLEANING HEAD AND METHOD FOR CLEANING HOSE-TYPE TUBE FILTERS

(76) Inventor: Christian Reining, Munster (DE)

( * ) Notice: Subject to any disclaimer, the term of this patent is extended or adjusted under 35 U.S.C. 154(b) by 322 days.

(21) Appl. No.: 12/285,570

(22) Filed: Oct. 8, 2008

(65) Prior Publication Data

US 2010/0083987 A1    Apr. 8, 2010

(51) Int. Cl.
*A47L 5/14* (2006.01)
*B01D 46/04* (2006.01)

(52) U.S. Cl.
USPC ......... 15/304; 15/316.1; 134/168 R; 134/172; 134/175; 134/198; 55/294; 95/280

(58) Field of Classification Search
USPC ................. 15/304, 312.1, 312.2, 315, 316.1, 15/318; 134/22.1, 22.12, 22.18, 24, 167 R, 134/168 R, 167 C, 172, 175, 198; 55/294, 55/302; 95/280
See application file for complete search history.

(56) References Cited

U.S. PATENT DOCUMENTS 5,182,832 A * 2/1993 McMahon ............ 15/304
2002/0007734 A1 * 1/2002 Felix ................. 95/280

FOREIGN PATENT DOCUMENTS

| EP | 0 065 094 | 11/1982 |
|---|---|---|
| EP | 1 543 872 | 6/2005 |
| JP | 2005 125293 | 5/2005 |

* cited by examiner

*Primary Examiner* — Saeed T Chaudhry

(57) ABSTRACT

A cleaning device (1) for hose filters comprising a cleaning head (5) having at least one nozzle (11) rotating about a longitudinal axis (L), is characterized in that the cleaning head (5) comprises a fixed jacket (15) having a smooth outer surface which surrounds the at least one rotating nozzle (11) at a distance and in which a series of through holes (17) are formed, said holes being distributed over the circumference of the jacket (15) and being arranged with respect to each nozzle (11) such that a jet emerging from each nozzle (11) during operation can pass through a through hole (17) at least intermittently.

22 Claims, 1 Drawing Sheet

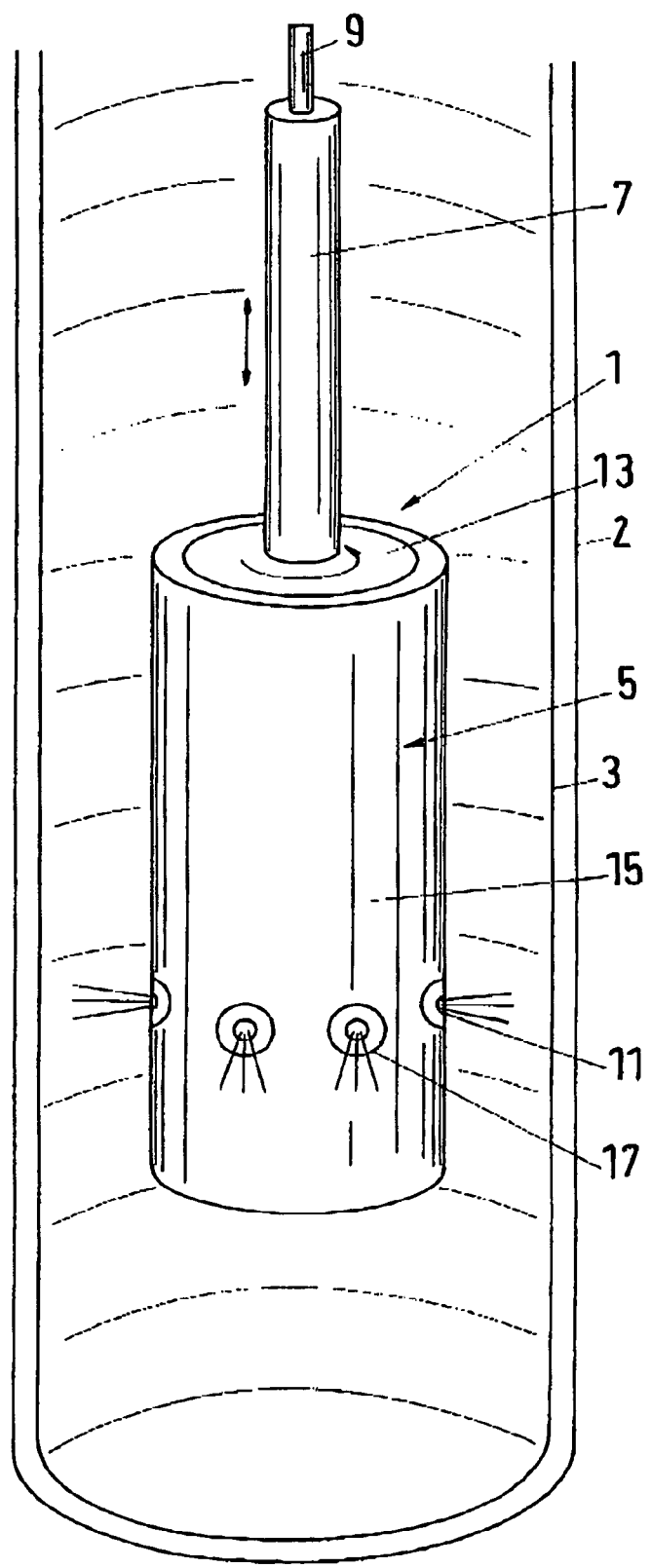

CLEANING DEVICE COMPRISING A CLEANING HEAD AND METHOD FOR CLEANING HOSE-TYPE TUBE FILTERS

FIELD OF THE INVENTION

The invention relates to a cleaning device for hose filters comprising a cleaning head having at least one nozzle rotating about a longitudinal axis as well as a method for cleaning hose filters.

BACKGROUND OF THE INVENTION

A cleaning device for hose filters comprising a cleaning head is known from EP No. 1 543 872.

The cleaning device described therein comprises a cleaning head on which at least one nozzle and in particular a plurality of nozzles are arranged rotatably about a longitudinal axis of the cleaning head. During operation, the cleaning head on a hose element is guided into a filter hose and is moved to and fro therein. A pressure medium is fed to the cleaning head via the hose element by means of a pressure medium source, which pressure medium emerges from the nozzles and impinges upon the inner wall of the filter hose. As a result, compression waves are generated in the filter hose, which bring about self-oscillations of the hose material so that a filtrate located on the filter hose drops down. During operation, as the pressure medium emerges from the nozzles, a negative pressure is produced in the vicinity thereof so that the cleaning head does not remain in the centre of the filter hose but is drawn to the inner wall of the filter hose. In fact, the hose element with the cleaning head describes a spiral movement along the longitudinal axis of the filter hose. Contact of the cleaning head with the material of the filter hose leads directly or at the latest after a few cleaning processes, to damage to the material. However, if a support cage remains in the filter hose during the cleaning process so that the cleaning head cannot impact against the material of the filter hose but against the support cage, the cleaning head becomes statically charged to that voltages of up to 2000 V to 3000 V are produced.

It is disadvantageous that in the aforesaid prior art during cleaning of filter hoses, contact of the cleaning head with the filter hose can lead to damage to the filter material. It is also disadvantageous that cleaning with an inserted support cage for protecting the filter material can lead to a considerable static charging.

SUMMARY OF THE INVENTION

It is therefore the object of the present invention to provide a cleaning device for hose filters and a method for cleaning a hose filter with such a cleaning device with which contract-free cleaning of the hose filter with support cage is possible.

The object is achieved whereby the cleaning head comprises a fixed jacket having a smooth outer surface which surrounds the at least one rotating nozzle at a distance and in which a series of through holes are formed, said holes being distributed over the circumference of the jacket and being arranged with respect to each nozzle such that a jet emerging from each nozzle during operation can pass through a through hole at least intermittently.

With the cleaning device according to the invention, it is now possible to move the cleaning device substantially along a longitudinal axis of a hose filter without this being drawn towards the inner surface of the hose filter or a support cage inserted therein due to a negative pressure during operation.

In addition, the jacket with a smooth outer surface prevents contact with an inserted support cage from causing static charging of the order of magnitude of the prior art.

Due to rotation of the nozzles or the cleaning head, the pressure-medium jet produces a negative pressure in a distance range of 5 to 6 mm from the nozzles in the direction of action of the same. Due to the jacket with the through holes in the area of the nozzles, a distance from the nozzle to the outlet side of the through hole or the outer surfaces of the jacket of about 10 mm is produced so that negative pressures can no longer occur on the outer side of the cleaning head. Even when the jacket outer surface comes in contact with the inner side of the hose filter or an inserted support cage, this does not lead to any extraction of the same or to a spiral rotary movement along the longitudinal axis. In addition, due to the smooth outer surface of the protective jacket, in the event of any contact with an inserted support cage, the friction is reduced in such a manner that hardly any or no friction-induced static charging occurs.

The cleaning head according to the invention additionally prevents this from moving on an undefined and uncontrolled spiral movement path along the longitudinal axis of the hose filter during operation. Rather, it is now possible to move the cleaning head to and fro always at the centre of a hose filter along its longitudinal axis during the cleaning operation.

Another advantage of the cleaning device according to the present invention is that the through holes in the circumference of the jacket produce a repeated interruption of the pressure jet emerging from the nozzles. The duration of the interruption is dependent on the distance of the through holes from one another. The pulses produced in this way ensure better cleaning with a smaller amount of pressure medium As a result of the fact that the cleaning process can take place with an inserted support cage, the time for a cleaning process is reduced so this also has the effect of reducing costs.

Finally, the possibility of cleaning using the inserted support cage prevents the development of dust and dirtying of the surroundings associated with removing the support cage so that subsequent cleaning work can be eliminated.

BRIEF DESCRIPTION OF THE DRAWING

A better understanding of the invention will be had with reference to the attached drawing wherein the FIGURE is a cross-sectional view showing the cleaning device of the present invention inserted into a tubular body.

DETAILED DESCRIPTION OF THE PREFERRED EMBODIMENT

One embodiment of the present invention is described in detail in the following with reference to the drawings.

The single FIGURE shows a schematically depicted cleaning device having a cleaning head according to the present invention which is inserted into a tubular body, wherein the tubular body is shown in cutaway view.

The schematic diagram in the FIGURE shows a situation in which the cleaning device 1 is inserted into a tubular body 2 in which a support cage 3 is located. The support cage 3 is shown in the FIGURE since cleaning with the present cleaning device 1 is also possible with the support cage 3 inserted. Naturally, the support cage 3 can also be removed and cleaning can then be carried out with the cleaning device 1.

The cleaning device comprises a cleaning head 5 which is attached to one end of a hose element 7. A connection 9 to a pressure-medium supply (not shown) exists via the hose element 7. The pressure medium used for cleaning is preferably compressed air but can basically be any compressed fluid which can be used as desired according to the present cleaning conditions. When using compressed air, the connection 9 is a usual pressure hose which is either passed through the hose element 7 to the cleaning head 5 and itself forms the hose element 7. On its circumference the cleaning head has at least one nozzle 11 which is rotatable about a longitudinal axis L of the cleaning head 5. In the present embodiment a plurality of nozzles 11 are arranged on the circumference of the cleaning head 5 which rotate about the longitudinal axis L of the cleaning head 5. The rotatability of the nozzles 11 about the longitudinal axis of the cleaning head 5 can be effected in any constructive manner. In the present embodiment an inner nozzle part 13 (see arrow) rotates about the longitudinal axis L. The nozzles 11 are attached to this inner nozzle part 13 with a predefinable, substantially radial or tangential direction of action.

A jacket 15 is attached externally around the inner nozzle part 13, which jacket is fixed, i.e. does not execute any rotation about the longitudinal axis L and has a smooth surface. At least one through hole 17 is formed in the jacket 15 which can align with a nozzle 11 according to the rotational position of the inner nozzle part 13, i.e. during a rotation of the inner nozzle part 13 or the nozzle 11, coincides once with the same nozzle 11 or the jet axis produced by said nozzle so that a pressure-medium jet can emerge from the corresponding through opening 17.

In the embodiment shown, a plurality of through openings 17 are provided in the circumference of the jacket 15. The number of through openings 17 can be identical to the number of nozzles 11 but this is not absolutely essential. By selecting a particular number of through holes 17 and a particular number of nozzles 11, the number of pulses per revolution of the inner nozzle part 13 or of the nozzles 11 and the frequency of a pulse per unit area of the tubular body 2 can be specified.

The jacket 15 sits at a distance from the nozzles 11 or the inner nozzle part 13. The distance between the nozzle 11 and the outer surface of the jacket 15 is 8 to 15 mm, preferably about 10 mm at the through holes 17. This distance between each nozzle 11 and the outer surface of the jacket 15 in the area of the at least one through hole 17 has the effect that no negative pressure is formed at the outer surface of the jacket 15 when a pressure jet emerges from the nozzle 11 and through the through opening 17.

The pulses generated as a result of the through holes 17 or the distances between the through holes 17 improves the cleaning of the hose filter 2. The amount of air required in a cleaning process can be reduced from 3000 l previously to 1000 l now with the cleaning device according to the invention.

The invention claimed is:

1. A cleaning device (1) for hose filters comprising: a cleaning head (5) having a plurality of nozzles (11), said plurality of nozzles being axially spaced along said cleaning head (5) and rotatably connected to said cleaning head (5) so that said plurality of nozzles rotate about a longitudinal axis (L) of said cleaning head (5), said cleaning head (5) including a fixed jacket (15) fixedly connected to said cleaning head (5) so that said jacket (15) cannot rotate relative to said cleaning head (5), said jacket (15) having a smooth outer surface which surrounds said plurality of nozzles (11) at a distance and in which a series of through holes (17) are formed, said through holes being axially distributed over the circumference of said jacket (15) in a plane substantially perpendicular to the longitudinal axis (L) of said cleaning head (5) and being arranged with respect to said plurality of nozzles (11) such that a jet emerging from each of said plurality of nozzles (11) during operation can pass through a through hole (17) at least intermittently, wherein said cleaning head (5) produces a pressure during operation which holds said cleaning head (5) at a distance from said hose body (2) and the distance between the plurality of nozzles (11) and the jacket (15) is between 8-15 ram.

2. The cleaning device according to claim 1, wherein said through holes (17) are distributed in a plane of action with said plurality of nozzles (11) over the circumference of said jacket (15).

3. The cleaning device according to claim 2, wherein said cleaning head (5) is arranged on a hose element (7) which can be moved to and fro along a longitudinal axis (L) of a hose body (2).

4. The cleaning device according to claim 3, wherein each of said plurality of nozzles (11) ejects a quantity of air of $\leqq 1000$ l for a cleaning process.

5. The cleaning device according to claim 4, wherein each of said plurality of nozzles (11) ejects a quantity of air of $\leqq 800$ l in a cleaning process.

6. The cleaning device according to claim 2, wherein said cleaning head (5) produces a pressure during operation.

7. The cleaning device according to claim 6, wherein each of said plurality of nozzles (11) ejects a quantity of air of $\leqq 1000$ l for a cleaning process.

8. The cleaning device according to claim 7, wherein each of said plurality of nozzles (11) ejects a quantity of air of $\leqq 800$ l in a cleaning process.

9. The cleaning device according to claim 2, wherein each of said plurality of nozzles (11) ejects a quantity of air of $\leqq 1000$ l for a cleaning process.

10. The cleaning device according to claim 9, wherein each of said plurality nozzles (11) ejects a quantity of air of $\leqq 800$ l in a cleaning process.

11. The cleaning device according to claim 1, wherein said cleaning head (5) is arranged on a hose element (7) which can be moved to and fro along a longitudinal axis (L) of a hose body (2).

12. The cleaning device according to claim 11, wherein each of said plurality of nozzles (11) ejects a quantity of air of $\leqq 1000$ l for a cleaning process.

13. The cleaning device according to claim 12, wherein each of said plurality of nozzles (11) ejects a quantity of air of $\leqq 800$ l in a cleaning process.

14. The cleaning device according to claim 1, wherein said cleaning head (5) produces a pressure during operation.

15. The cleaning device according to claim 14, wherein each of said plurality of nozzles (11) ejects a quantity of air of $\leqq 1000$ l for a cleaning process.

16. The cleaning device according to claim 15, wherein each of said plurality of nozzles (11) ejects a quantity of air of $\leqq 800$ l in a cleaning process.

17. The cleaning device according to claim 1, wherein each of said plurality of nozzles (11) ejects a quantity of air of $\leqq 1000$ l for a cleaning process.

18. The cleaning device according to claim 17, wherein each of said plurality of nozzles (11) ejects a quantity of air of $\leqq 800$ l in a cleaning process.

19. The cleaning device according to claim 11, wherein each of said plurality of nozzles (11) ejects a quantity of air of $\leqq 1000$ l for a cleaning process.

20. The cleaning device according to claim 19, wherein each of said plurality of nozzles (11) ejects a quantity of air of $\leqq 800$ l in a cleaning process.

21. The cleaning device according to claim 1, wherein each of said plurality of nozzles (11) ejects a quantity of air of $\leqq 800$ l in a cleaning process.

22. The cleaning device of claim 1, wherein the distance between the plurality of nozzles (11) and the jacket (15) is 10 mm.

* * * * *